United States Patent
Arai

(10) Patent No.: US 10,069,819 B2
(45) Date of Patent: Sep. 4, 2018

(54) INFORMATION PROCESSING APPARATUS, INFORMATION PROCESSING METHOD, AND INFORMATION PROCESSING SYSTEM

(71) Applicant: Shohei Arai, Kanagawa (JP)

(72) Inventor: Shohei Arai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 206 days.

(21) Appl. No.: 15/064,700

(22) Filed: Mar. 9, 2016

(65) Prior Publication Data

US 2016/0277384 A1  Sep. 22, 2016

(30) Foreign Application Priority Data

Mar. 20, 2015 (JP) ................................. 2015-058019

(51) Int. Cl.
| | |
|---|---|
| H04L 29/06 | (2006.01) |
| G06F 21/62 | (2013.01) |
| H04M 3/56 | (2006.01) |
| G06F 7/04 | (2006.01) |

(Continued)

(52) U.S. Cl.
CPC ........ H04L 63/083 (2013.01); G06F 21/6218 (2013.01); H04L 63/0876 (2013.01); H04L 63/102 (2013.01); H04L 63/104 (2013.01); H04M 3/56 (2013.01)

(58) Field of Classification Search
None
See application file for complete search history.

(56) References Cited

U.S. PATENT DOCUMENTS

| 5,483,588 | A | 1/1996 | Eaton et al. |
| 7,996,774 | B1 * | 8/2011 | Sidenur ................. G06Q 10/10 715/743 |
| 8,743,022 | B2 | 6/2014 | Masuda et al. |

(Continued)

FOREIGN PATENT DOCUMENTS

| JP | H10-190655 | 7/1998 |
| JP | 2005-227822 | 8/2005 |

(Continued)

OTHER PUBLICATIONS

Extended European Search Report dated May 25, 2016.

Primary Examiner — Shin Hon (Eric) Chen
(74) Attorney, Agent, or Firm — IPUSA, PLLC

(57) ABSTRACT

An information processing apparatus includes a storage that stores access-limited identification information and access-unlimited identification information, and one or more processors that execute a process. The process includes receiving a login request to log into the information processing apparatus from a terminal and performing a login process based on an account specified by the terminal; when an identification information request is received from a non-logged-in terminal that has not logged into the information processing apparatus, sending the access-unlimited identification information to the non-logged-in terminal; and when the identification information request is received from a logged-in terminal that has logged into the information processing apparatus, sending the access-limited identification information accessible by the account specified by the logged-in terminal and the access-unlimited identification information to the logged-in terminal.

9 Claims, 18 Drawing Sheets

(51) Int. Cl.
*G06F 15/16* (2006.01)
*G06F 17/30* (2006.01)

(56) References Cited

U.S. PATENT DOCUMENTS

| | | | | |
|---|---|---|---|---|
| 2006/0095514 | A1* | 5/2006 | Wang | G06Q 10/107 709/204 |
| 2009/0019526 | A1 | 1/2009 | Fukushima | |
| 2009/0064284 | A1* | 3/2009 | Poston | G06F 21/10 726/4 |
| 2012/0036195 | A1* | 2/2012 | Kennedy | H04L 12/18 709/206 |
| 2012/0110196 | A1 | 5/2012 | Balasaygun et al. | |
| 2013/0061327 | A1* | 3/2013 | Thomas | H04L 63/1433 726/25 |
| 2013/0167039 | A1* | 6/2013 | Howell | G06F 17/30867 715/748 |
| 2013/0191896 | A1* | 7/2013 | Adderly | H04W 12/06 726/6 |
| 2013/0198657 | A1* | 8/2013 | Jones | H04L 67/36 715/758 |
| 2013/0227015 | A1 | 8/2013 | Mihara et al. | |
| 2013/0239180 | A1* | 9/2013 | Weller | G06Q 10/101 726/4 |
| 2014/0019882 | A1* | 1/2014 | Chew | G06Q 10/10 715/753 |
| 2014/0267566 | A1* | 9/2014 | Hamada | H04N 7/15 348/14.08 |
| 2014/0366098 | A1* | 12/2014 | Savage | H04L 65/403 726/4 |
| 2015/0264054 | A1* | 9/2015 | DeLuca | H04L 63/105 726/28 |

FOREIGN PATENT DOCUMENTS

| | | |
|---|---|---|
| JP | 2009-020826 | 1/2009 |
| JP | 2012-108872 | 6/2012 |
| JP | 5063455 | 10/2012 |
| JP | 2013-175059 | 9/2013 |
| JP | 2015-103131 | 6/2015 |
| WO | 2015/079818 | 6/2015 |

\* cited by examiner

FIG.6

| GROUP NAME | USER LIST | |
|---|---|---|
| Group1 | AA, BB, CC, DD | ~41 |
| Group2 | BB, CC | |
| ... | ... | |

FIG.7

| USER NAME | PASSWORD | |
|---|---|---|
| AA | × × | ~42 |
| BB | △△ | |
| ... | ... | |

FIG.8

| CONFERENCE ID | CONFERENCE NAME | START DATE AND TIME | CONFERENCE MATERIAL | ACCESS-ALLOWED GROUP |
|---|---|---|---|---|
| 1 | CONFERENCE A | 201501301400 | □□□ | Group1 |
| 2 | CONFERENCE B | 201502021100 | ○○○ | Group2 |
| 3 | CONFERENCE C | 201502081500 | ◇◇◇ | — |
| ... | ... | ... | ... | ... |

OOO CONFERENCE CENTER

↑ LOGIN

TO BE HELD /PARTICIPATED
📄 TODAY'S CONFERENCE

CONFERENCE MANAGEMENT
🔍 CONFERENCE LIST
+ REGISTER NEW CONFERENCE

OTHERS
② HELP
ⓘ ABOUT THIS APPLICATION

---

CONFERENCE MANAGEMENT/REGISTRATION

○ ENTER INFORMATION ON CONFERENCE TO BE REGISTERED.
INFORMATION

| CONFERENCE NAME | REQUIRED 0/100 | |
| --- | --- | --- |
| START DATE AND TIME | REQUIRED | REQUIRED |
| END DATE AND TIME | | |
| LOCATION | | |
| NOTE | | |
| PARTICIPATION PASSWORD | | RETYPE |
| ORGANIZER KEY | | RETYPE |
| DISPLAY IN CONFERENCE LIST | ● DISPLAY  ○ NOT DISPLAY | |
| PREVENT CHANGE OF PRESENTER | NO   THIS OPTION CAN BE CHANGED ONLY WHEN ORGANIZER KEY IS ENTERED. | |
| DOWNLOAD OF MATERIAL | ● ALLOW  ○ NOT ALLOW | |

SUBJECT/MATERIAL

| ⦿ 1 | SUBJECT NAME SUBJECT A | PRESENTER MASUMOTO | | |
| --- | --- | --- | --- | --- |
| | MATERIAL NAME | | NOTE | ALLOW DOWNLOAD  ORIGINAL FILE |
| | ☐ MATERIAL 001 | | ABCDEFGH | ☑   YES |
| | ☐ MATERIAL 002 | | XYZABCDE | ☑   YES |
| ○ 2 | SUBJECT NAME SUBJECT B | PRESENTER MASUMOTO | | |
| | MATERIAL NAME | | NOTE | ALLOW DOWNLOAD  ORIGINAL FILE |
| | ☐ MATERIAL 002 | | ABCDEFGH | ☑   YES |

[ADD]    [EDIT]    [DELETE]

[SAVE]

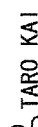

FIG.15

○○○ CONFERENCE CENTER

CONFERENCE MANAGEMENT/CONFERENCE LIST ~1200

○ SPECIFY CONDITIONS TO SEARCH FOR CONFERENCES.

SEARCH CRITERIA

| CONFERENCE ID/CONFERENCE NAME | |
|---|---|
| START DATE AND TIME | [ ] PREVIOUS DAY / NEXT DAY |
| CONFERENCE STATUS | ⦿ ALL  ○ BEING HELD  ○ UNABLE TO BE HELD<br>○ NOT YET HELD |

SEARCH RESULT ~1201

| CONFERENCE ID | CONFERENCE NAME | START DATE AND TIME | CONFERENCE STATUS |
|---|---|---|---|
| ○ 1045-150129 | TESTTEST | 2015/01/29 09:30 | UNABLE TO BE HELD |
| ○ 4475-150126 | TESTESTEST | 2015/01/29 13:30 | UNABLE TO BE HELD |
| ○ 3825-150202 | TKO | 2015/02/02 13:00 | NOT YET HELD |

⋘ PREVIOUS 10 RECORDS   1-3/3   ⋙ NEXT 10 RECORDS

[CONFERENCE DETAILS]

↑ LOGIN

TO BE HELD/PARTICIPATED
▢ TODAY'S CONFERENCE

CONFERENCE MANAGEMENT
◦⚬ CONFERENCE LIST
+ REGISTER NEW CONFERENCE

OTHERS
? HELP
ⓘ ABOUT THIS APPLICATION

FIG. 16

| | CONFERENCE MANAGEMENT/CONFERENCE LIST | | | |
|---|---|---|---|---|
| ○○○ CONFERENCE CENTER | ○ SPECIFY CONDITIONS TO SEARCH FOR CONFERENCES. | | | |
| ⚬ TARO KAI | SEARCH CRITERIA | | | |
| ⬇ LOGOUT | CONFERENCE ID/CONFERENCE NAME [          ] | | | |
| TO BE HELD /PARTICIPATED | START DATE AND TIME [          ] [PREVIOUS DAY] [NEXT DAY] | | | |
| 🗐 TODAY'S CONFERENCE | CONFERENCE STATUS  ⦿ ALL   ○ BEING HELD ○ NOT YET HELD  ○ UNABLE TO BE HELD | | | |
| CONFERENCE MANAGEMENT | | | | |
| ⚯ CONFERENCE LIST | SEARCH RESULT | | | |
| ＋ REGISTER NEW CONFERENCE | CONFERENCE ID | CONFERENCE NAME | START DATE AND TIME | CONFERENCE STATUS |
| | ○ 7706-150126 | NO SUBJECT | 2015/01/26 10:00 | UNABLE TO BE HELD |
| OTHERS | ○ 6492-150127 | WITH SUBJECT BY KAWAKUBO | 2015/01/28 09:00 | UNABLE TO BE HELD |
| ❓ HELP | ○ 0323-150127 | WITH SUBJECT | 2015/01/28 09:45 | UNABLE TO BE HELD |
| ⓘ ABOUT THIS APPLICATION | ○ 3647-150128 | AGENDA | 2015/01/28 15:45 | UNABLE TO BE HELD |
| | ○ 1045-150129 | TESTTEST | 2015/01/29 09:30 | UNABLE TO BE HELD |
| | ○ 5039-150129 | WITH IMPORTANT SUBJECT | 2015/01/29 11:00 | UNABLE TO BE HELD |
| | ○ 4475-150126 | TESTESTEST | 2015/01/29 13:30 | UNABLE TO BE HELD |
| | ○ 5410-150129 | FOR SUBJECT REFACTORING | 2015/01/29 17:00 | UNABLE TO BE HELD |
| | ○ 0114-150130 | PASSWORD | 2015/01/30 09:15 | UNABLE TO BE HELD |
| | ○ 3825-150202 | TKO | 2015/02/02 13:00 | NOT YET HELD |
| | [CONFERENCE DETAILS] | ⸬ PREVIOUS 10 RECORDS  1-10/12  ⸬ NEXT 10 RECORDS | | |

○○○ CONFERENCE CENTER

TARO KAI  [LOGOUT]

TO BE HELD/PARTICIPATED
TODAY'S CONFERENCE

CONFERENCE MANAGEMENT
CONFERENCE LIST
+ REGISTER NEW CONFERENCE

OTHERS
? HELP
i ABOUT THIS APPLICATION

CONFERENCE MANAGEMENT/CONFERENCE LIST

○ SPECIFY CONDITIONS TO SEARCH FOR CONFERENCES.

SEARCH CRITERIA

CONFERENCE ID/CONFERENCE NAME

START DATE AND TIME  [PREVIOUS DAY] [NEXT DAY]

CONFERENCE STATUS
● ALL  ○ BEING HELD
○ NOT YET HELD  ○ UNABLE TO BE HELD

SEARCH RESULT

| CONFERENCE ID | CONFERENCE NAME |
|---|---|
| 1045-150129 | TESTTEST |
| START DATE AND TIME | CONFERENCE STATUS |
| 2015/01/29 09:30 | UNABLE TO BE HELD |

| CONFERENCE ID | CONFERENCE NAME |
|---|---|
| 3825-150202 | TKO |
| START DATE AND TIME | CONFERENCE STATUS |
| 2015/02/02 13:00 | NOT YET HELD |

| CONFERENCE ID | CONFERENCE NAME |
|---|---|
| 7706-150126 | NO SUBJECT |
| START DATE AND TIME | CONFERENCE STATUS |
| 2015/01/29 09:30 | UNABLE TO BE HELD |

| CONFERENCE ID | CONFERENCE NAME |
|---|---| xxxxx
xxxxxx
xx
xxxxxxxxxxxxxxx

*****!!
***************
*********

~1500

INFORMATION PROCESSING APPARATUS, INFORMATION PROCESSING METHOD, AND INFORMATION PROCESSING SYSTEM

CROSS-REFERENCE TO RELATED APPLICATION

The present application is based upon and claims the benefit of priority of Japanese Patent Application No. 2015-058019, filed on Mar. 20, 2015, the entire contents of which are incorporated herein by reference.

BACKGROUND OF THE INVENTION

1. Field of the Invention

An aspect of this disclosure relates to an information processing apparatus, an information processing method, and an information processing system.

2. Description of the Related Art

Conference systems exist that enable participants of a conference (or a meeting) to share conference materials and conference information (e.g., the date and time when a conference is held). Also, there exist conference systems that can limit access to conference materials and conference information.

For example, Japanese Laid-Open Patent Publication No. 2009-20826 discloses an electronic conference server that can control access to electronic data used in an electronic conference based on access rights of participants. In this electronic conference server, a folder is created for each participant of an electronic conference such that only the participant can access the folder, and electronic data corresponding to an access right of the participant is copied into the folder.

Here, there exists a conference system where access to a list of identifiers of conference materials and conference information is limited by accounts, and a conference system where access to a list of identifiers of conference materials and conference information is not limited. For example, a user selects one of these conference systems depending on the contents of conference materials and conference information.

SUMMARY OF THE INVENTION

In an aspect of this disclosure, there is provided an information processing apparatus connected to a plurality of terminals. The information processing apparatus includes a first storage that stores access-limited identification information associated with first electronic data to be shared and displayed by the terminals and access-unlimited identification information associated with second electronic data to be shared and displayed by the terminals, access to the access-limited identification information being limited by accounts and access to the access-unlimited identification information being not limited by the accounts; and one or more processors that execute a process. The process includes receiving a login request to log into the information processing apparatus from each of the terminals, and performing a login process based on an account specified by the each of the terminals; when an identification information request is received from a non-logged-in terminal of the terminals that has not logged into the information processing apparatus, sending the access-unlimited identification information to the non-logged-in terminal; and when the identification information request is received from a logged-in terminal of the terminals that has logged into the information processing apparatus, sending the access-limited identification information accessible by the account specified by the logged-in terminal and the access-unlimited identification information to the logged-in terminal.

BRIEF DESCRIPTION OF THE DRAWINGS

FIG. 6 is a table illustrating an exemplary configuration of a group information DB;

FIG. 7 is a table illustrating an exemplary configuration of a user information DB;

FIG. 8 is a table illustrating an exemplary configuration of a conference information DB;

FIG. 11 is a drawing illustrating an exemplary pre-login conference registration screen;

FIG. 12 is a drawing illustrating an exemplary post-login conference registration screen;

FIG. 15 is a drawing illustrating an exemplary pre-login conference list screen;

FIG. 16 is a drawing illustrating an exemplary post-login conference list screen;

FIG. 19 is a drawing illustrating another exemplary post-login conference list screen.

DESCRIPTION OF THE PREFERRED EMBODIMENTS

The related-art conference systems can handle only one type of identification information, i.e., access-limited identification information for identifying conference information and materials whose access is limited by an account or access-unlimited identification information for identifying conference information and materials whose access is not limited by an account.

An aspect of this disclosure provides an information processing apparatus, an information processing method, and an information processing system that can handle both access-limited identification information access to which is limited by an account and access-unlimited identification information access to which is not limited by an account.

Embodiments of the present invention are described below with reference to the accompanying drawings.

A conference system 1 according to an embodiment is described below. The conference system 1 is an example of an information processing system.

«System Configuration»

Figure 1:
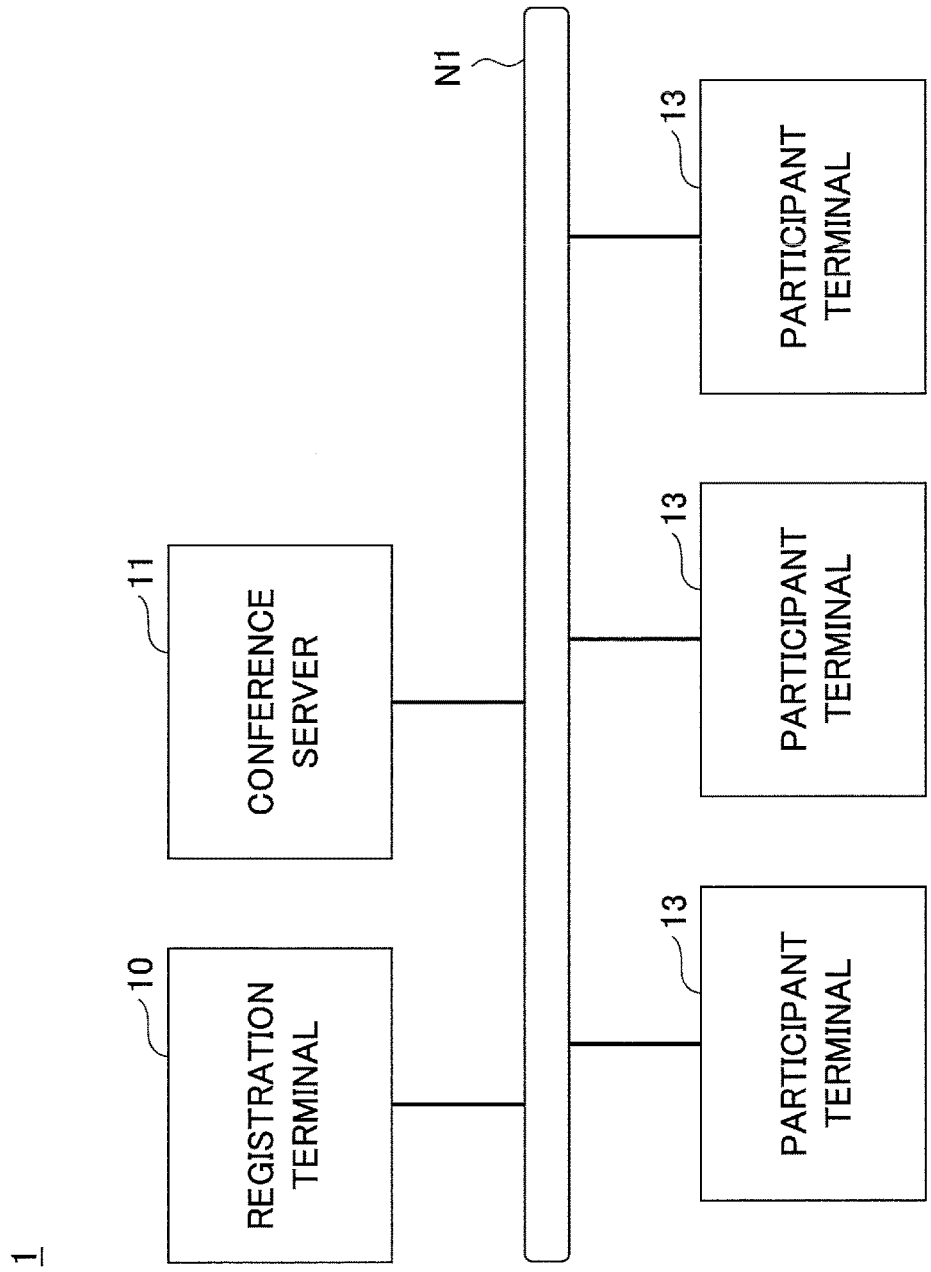
FIG. 1 is a drawing illustrating an exemplary configuration of a conference system.

FIG. 1 is a drawing illustrating an exemplary configuration of the conference system 1. As illustrated by FIG. 1, the conference system 1 may include a registration apparatus 10, a conference server 11, and multiple participant terminals 13 that are connected to a network N1 such as a local area network (LAN). In the example of FIG. 1, the conference system 1 includes the registration terminal 10 and the participant terminals 13 as separate apparatuses. However, one or more of the participant terminals 13 may be configured to perform functions of the registration terminal 10.

The registration terminal 10 includes a function to register conference information and conference materials in the conference server 11. For example, organizers and presenters of conferences can register conference information and conference materials in the conference server 11 by using the registration terminal 10.

The registration terminal 10 is an apparatus to be operated by organizers and presenters of conferences. The registration terminal 10 may be implemented by, for example, a personal computer (PC), a portable information terminal such as a tablet computer, a smartphone, a cellphone, or a personal digital assistant (PDA), or a dedicated conference terminal. Also, the registration terminal 10 may be implemented by an image forming apparatus such as a printer or a multifunction peripheral, or a projector.

The conference server 11 manages conference information and conference materials. The conference server 11 also includes functions to organize conferences, to control participation to the conferences, and to send (or distribute) input operations of presenters to the participant terminals 13 in real time. The conference server 11 may be implemented, for example, by software or services running on one computer.

Also, the conference server 11 may be implemented by software or services running on multiple computers. Further, the conference server 11 may be implemented by a cloud service. The hardware of the conference server 11 may be implemented even by a terminal as long as it can provide functions necessary for the conference server 11.

Each participant terminal 13 includes a function to obtain conference information and conference materials from the conference server 11 and a function to participate in a conference. Presenters and participants of a conference can participate in the conference by using the participant terminals 13. The participant terminals 13 are apparatuses to be operated by presenters and participants of a conference.

The participant terminal 13 may be implemented by, for example, a personal computer (PC), a portable information terminal such as a tablet computer, a smartphone, a cellphone, or a personal digital assistant (PDA), a display apparatus such as an electronic whiteboard, a projector, or a dedicated conference terminal. Also, the participant terminal 13 may be implemented by an image forming apparatus such as a printer or a multifunction peripheral. While participating in a conference, the participant terminal 13 receives input operations of presenters from the conference server 11 in real time, and shares a display screen with other participant terminals 13.

«Hardware Configurations»

Figure 2:
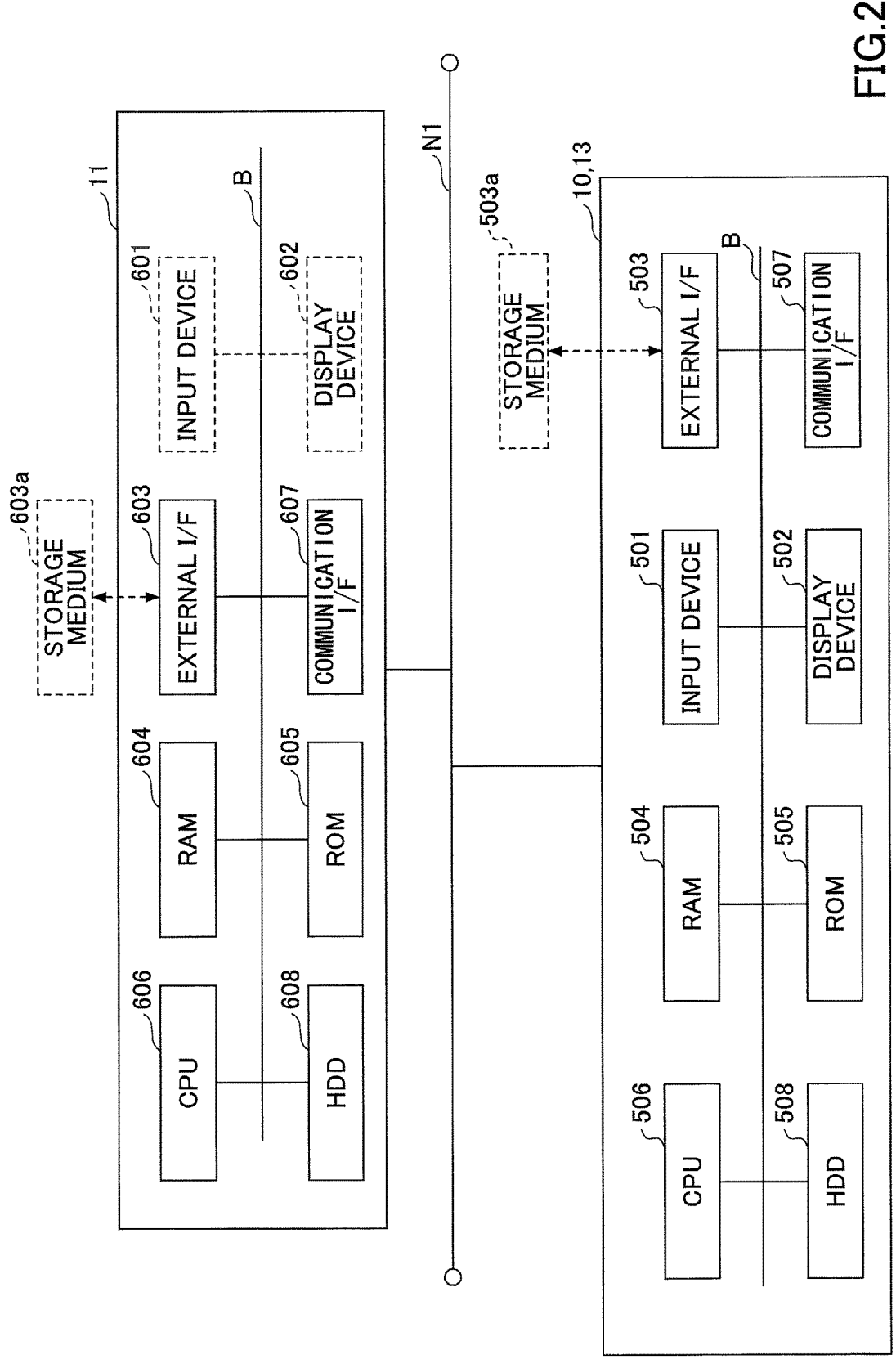
FIG. 2 is a drawing illustrating exemplary hardware configurations of computers implementing a conference system.

The registration terminal 10, the conference server 11, and the participant terminal 13 may be implemented by computers with hardware configurations as illustrated by FIG. 2.

FIG. 2 is a drawing illustrating exemplary hardware configurations of computers implementing the conference system 1.

As illustrated in FIG. 2, each of the registration terminal 10 and the participant terminal 13 may be implemented by a computer including an input device 501, a display device 502, an external I/F 503, a random access memory (RAM) 504, a read-only memory (ROM) 505, a central processing unit (CPU) 506, a communication I/F 507, and a hard disk drive (HDD) 508 that are connected to each other via a bus B. Each of the registration terminal 10 and the participant terminal 13 may also include a camera, a microphone, and a speaker.

The input device 501 includes, for example, a keyboard, a mouse, and/or a touch panel, and is used by a user to input instructions (or operation signals). The display device 502 displays, for example, computer-processing results. The communication I/F 507 is an interface for connecting the computer to a network. Thus, the computer can perform data communications via the communication I/F 507.

The HDD 508 is an example of a non-volatile storage device for storing various programs and data. For example, the HDD 508 may store basic software or an operating system (OS) for controlling the entire computer, and application software for providing various functions on the OS. The HDD 508 may be replaced with another type of drive such as a solid-state drive (SSD) that uses a flash memory as a storage medium.

The external I/F 503 is an interface between the computer and an external device such as a storage medium 503*a*. The computer can read and write data from and to the storage medium 503*a* via the external I/F 503. Examples of the storage medium 503*a* include a flexible disk, a compact disk (CD), a digital versatile disk (DVD), a secure digital (SD) memory card, and a universal serial bus (USB) memory.

The ROM 505 is an example of a non-volatile semiconductor memory (storage device) that can retain programs and data even when power is turned off. For example, the ROM 505 stores programs and data such as a basic input/output system (BIOS) that is executed when the computer is turned on, operating system (OS) settings, and network settings. The RAM 504 is an example of a volatile semiconductor memory (storage device) for temporarily storing programs and data.

The CPU 506 is a processor that loads programs and data from storage devices such as the ROM 505 and the HDD 508 into the RAM 504, and executes the loaded programs to control the entire computer and to implement various functions of the computer (i.e., functions of the registration terminal 10 and/or the participant terminal 13).

With the above hardware configuration, each of the registration terminal 10 and the participant terminal 13 can execute programs to perform various processes described later.

As illustrated in FIG. 2, the conference server 11 may be implemented by a computer including an input device 601, a display device 602, an external I/F 603, a RAM 604, a ROM 605, a CPU 606, a communication I/F 607, and a HDD 608 that are connected to each other via a bus B. These hardware components of the conference server 11 have functions similar to those of the registration terminal 10 and the participant terminal 10 described above, and therefore detailed descriptions of these hardware components are omitted here. Also, the conference server 11 may be configured such that the input device 601 and/or the display device 602 are connected to the conference server 11 when necessary.

With the above hardware configuration, the conference server 11 can execute programs to perform various processes described later.

«Functional Configurations»

Exemplary functional configurations of the registration terminal 10, the conference server 11, and the participant terminal 13 of the conference system 1 are described below.

<Registration Terminal>

Figure 3:
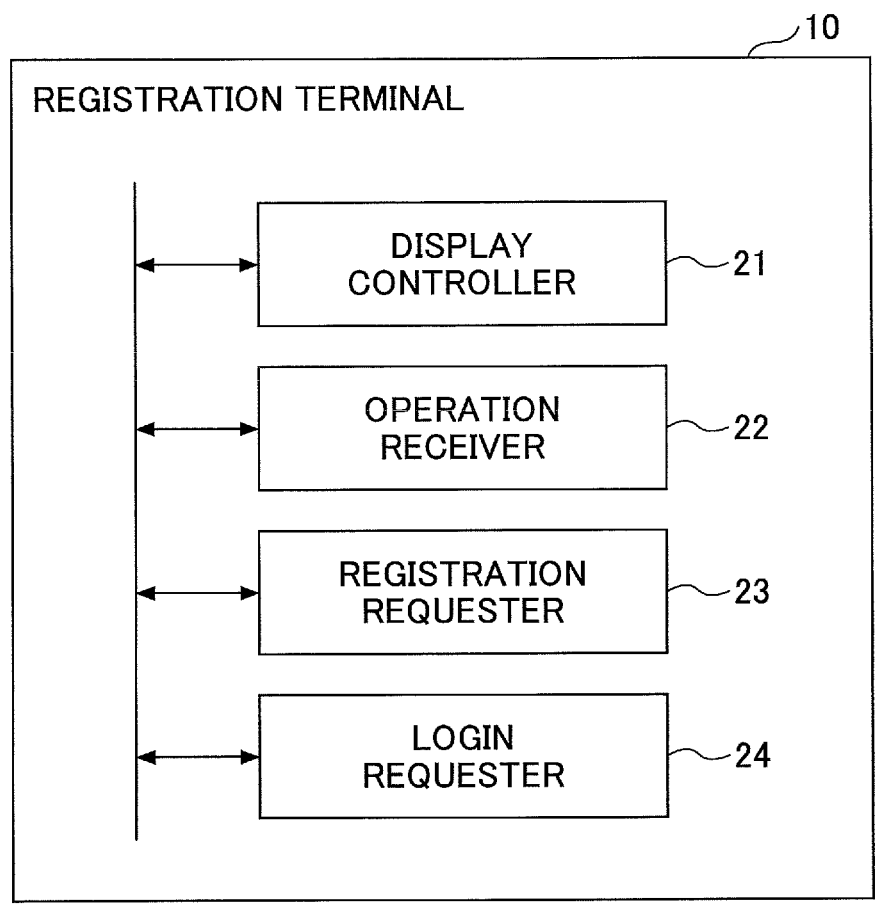
FIG. 3 is a block diagram illustrating an exemplary functional configuration of a registration terminal.

FIG. 3 is a block diagram illustrating an exemplary functional configuration of the registration terminal 10. The registration terminal 10 executes a program to implement a display controller 21, an operation receiver 22, a registration requester 23, and a login requester 24.

The display controller 21 displays, for example, a conference registration screen and an account management screen in response to instructions from organizers and presenters of conferences. The operation receiver 22 receives, for example, account information including group information and user information, and conference-related information including conference information and conference materials entered by organizers and presenters on the account management screen and the conference registration screen.

The registration requester 23 requests the conference server 11 to register conference-related information entered on the conference registration screen, and thereby registers the conference-related information in the conference server 11. Also, the registration requester 23 requests the conference server 11 to register account information entered on the account management screen, and thereby registers the account information in the conference server 11. The login requester 24 requests a login to the conference server 11.

<Conference Server>

Figure 4:
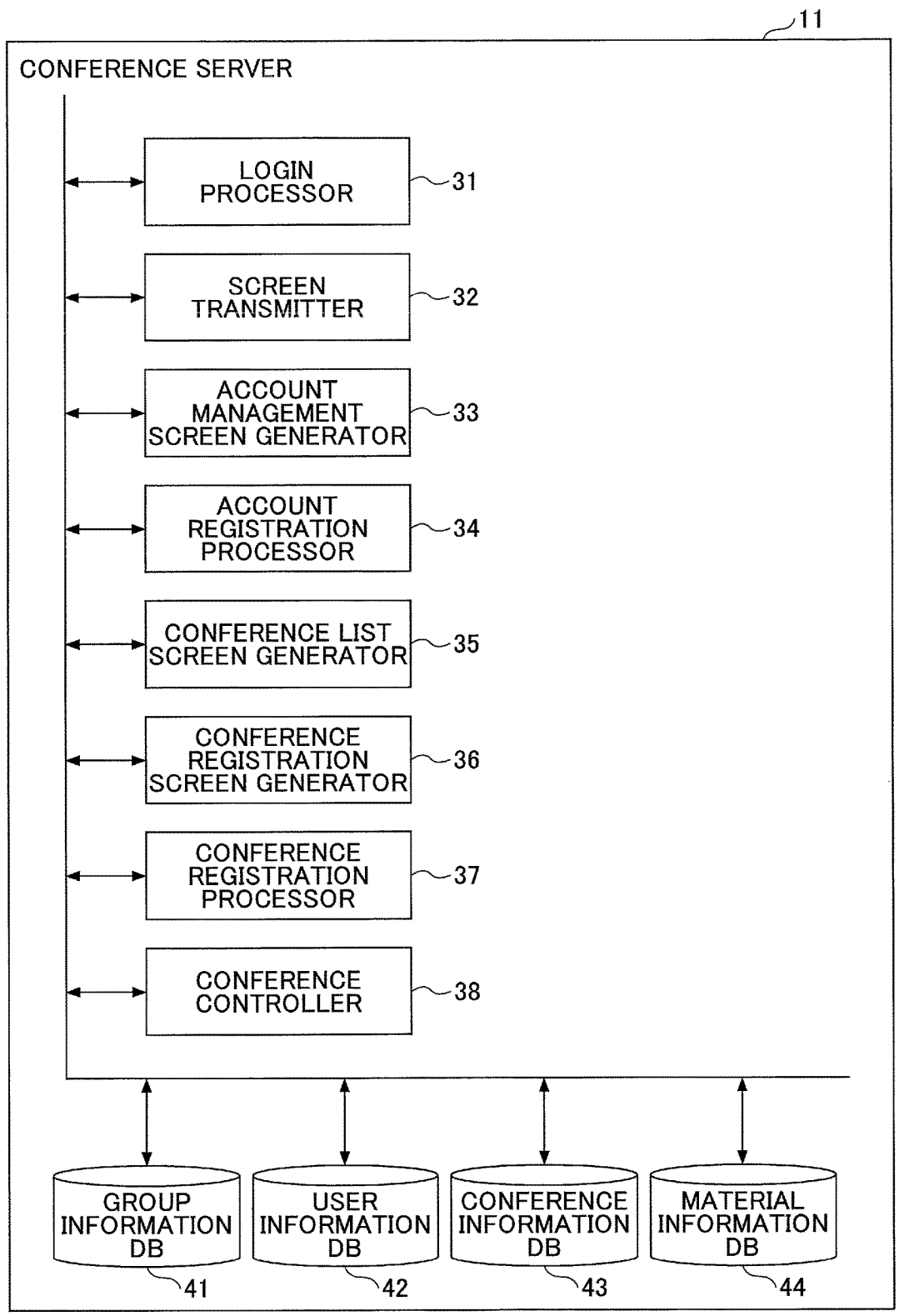
FIG. 4 is a block diagram illustrating an exemplary functional configuration of a conference server.

FIG. 4 is a block diagram illustrating an exemplary functional configuration of the conference server 11. The conference server 11 executes a program to implement a login processor 31, a screen transmitter 32, an account management screen generator 33, an account registration processor 34, a conference list screen generator 35, a conference registration screen generator 36, a conference registration processor 37, a conference controller 38, a group information database (DB) 41, a user information DB 42, a conference information DB 43, and a material information DB 44.

The login processor 31 performs login processes in response to login requests from the registration terminal 10 and the participant terminal 13. The screen transmitter 32 sends screen information of an account management screen, a conference registration screen, and a conference list screen to the registration terminal 10. Also, the screen transmitter 32 sends screen information of a conference list screen to the participant terminal 13.

The account management screen generator 33 generates an account management screen. The account registration processor 34 receives a request to register group information and user information from the registration terminal 10, and registers the group information and the user information in the group information DB 41 and the user information DB 42.

The conference list screen generator 35 generates a conference list screen. The conference list screen includes a list of conferences that can be held or participated in. "Conferences that can be held" in the list indicate conferences that have not been held yet and are to be held. "Conferences that can be participated in" in the list indicate conferences that have already been started and can still be participated in. The conference registration screen generator 36 generates a conference registration screen. The conference registration processor 37 receives a request to register conference-related information from the registration terminal 10, and registers the conference-related information in the conference-related information DB 43 and the material information DB 44.

The conference controller 38 sends conference materials to the participant terminal 13 based on a material request from the participant terminal 13. Also, the conference controller 38 receives input operations (e.g., entered commands, information, and so on) from a participant terminal 13 of a presenter of a conference, and sends (or distributes) the input operations to other participant terminals 13 of participants of the conference to enable the participant terminals 13 to share a display screen.

The group information DB 41 stores group information. The user information DB 42 stores user information. The conference information DB 43 stores conference information. The material information DB 44 stores material information indicating conference materials and material data of the conference materials. The material information may include locations where the material data is stored. In this case, the material data may be stored in an apparatus such as a file server other than the conference server 11. Examples of material data include document data, image data, video data, audio data, and text data.

<Participant Terminal>

Figure 5:
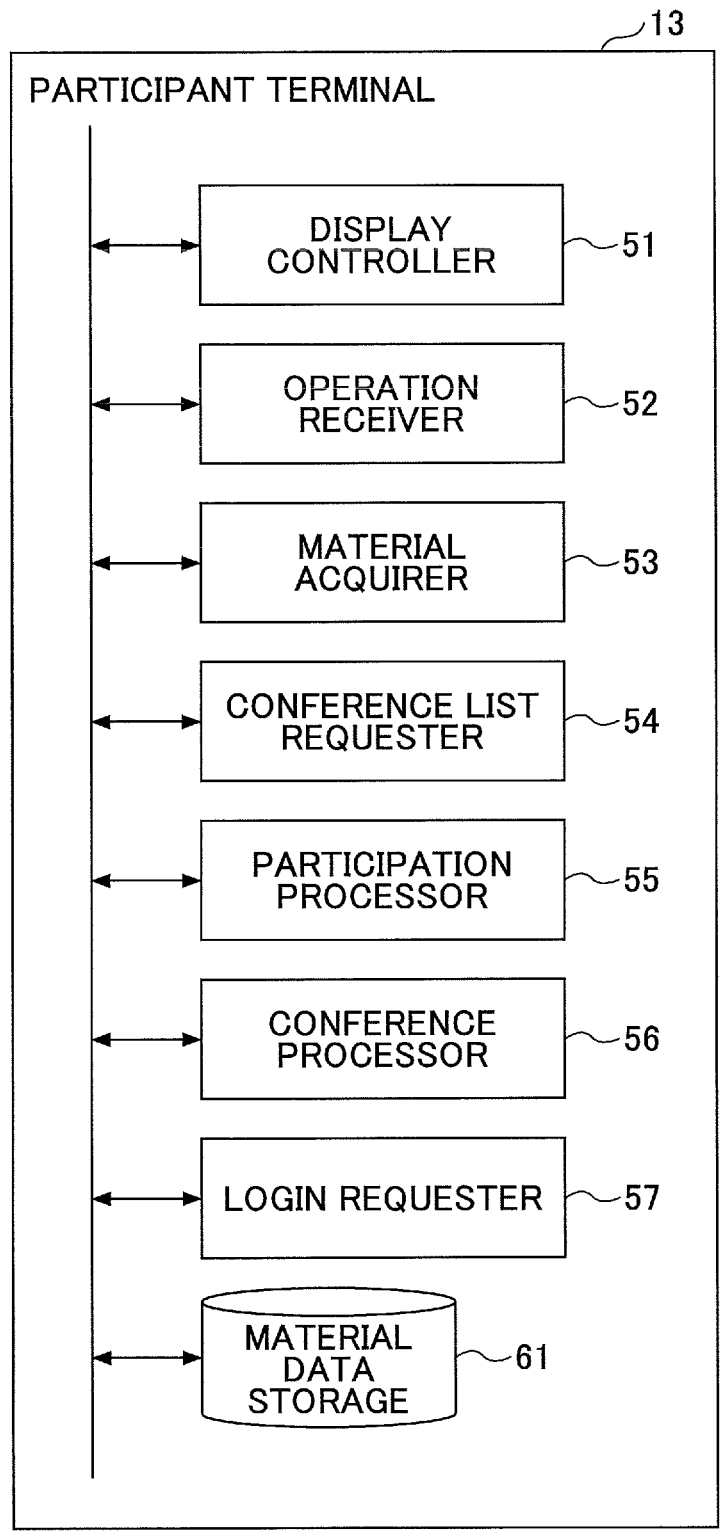
FIG. 5 is a block diagram illustrating an exemplary functional configuration of a participant terminal.

FIG. 5 is a block diagram illustrating an exemplary functional configuration of the participant terminal 13. The participant terminal 13 executes a program to implement a display controller 51, an operation receiver 52, a material acquirer 53, a conference list requester 54, a participation processor 55, a conference processor 56, a login requester 57, and a material data storage 61. The program executed by the participant terminal 13 is, for example, an application installed in the participant terminal 13.

The display controller 51 displays, for example, a conference list screen and a conference screen in response to instructions from a presenter or a participant of a conference. The operation receiver 52 receives operations performed by a presenter or a participant on the conference list screen and the conference screen.

The material acquirer 53 sends a material request to the conference server 11 to obtain conference materials from the conference server 11. The conference list requester 54 sends a conference list screen request to the conference server 11 to obtain, from the conference server 11, screen information of a conference list screen including a list of conferences that are to be held or can be participated in.

The participation processor 55, when receiving a request to participate in a conference included in the list of conferences from a presenter or a participant, sends a participation request to the conference server 11 to participate in the conference. The conference processor 56 receives information necessary to share a display screen from the conference server 11. Also, the conference processor 56 updates the conference screen based on input operations of a presenter sent from the conference server 11 and thereby shares the display screen. The login requester 57 requests a login to the conference server 11. The material data storage 61 stores material data of conference materials obtained from the conference server 11.

<Group Information>

FIG. 6 is a table illustrating an exemplary configuration of the group information DB 41. As illustrated by FIG. 6, the group information DB 41 stores group names of groups in association with lists of user names of users belonging to the respective groups. A group name is an example of identification information for uniquely identifying a group. A list of user names belonging to a group is an example of a list of identification information for uniquely identifying users belonging to a group.

In the group information DB 41 of FIG. 6, multiple users can be specified for each group. Also in the group information DB 41 of FIG. 6, one user can belong to multiple groups.

<User Information>

FIG. 7 is a table illustrating an exemplary configuration of the user information DB 42. As illustrated by FIG. 7, the user information DB 42 stores user names and passwords in association with each other. A user name is an example of identification information for uniquely identifying a user. A password is an example of secret information associated with a user name.

<Conference Information>

FIG. 8 is a table illustrating an exemplary configuration of the conference information DB 43. As illustrated by FIG. 8, the conference information DB 43 stores conference IDs, conference names, start dates and times, conference materials, and access-allowed groups in association with each other. A conference ID is an example of identification information for uniquely identifying a conference. A conference name is a name of a conference. A start date and time indicates the date and time when a conference starts. A conference material indicates a document or any other type of data used in a conference.

An access-allowed group indicates a group name of a group allowed to access a conference. Users belonging to the group indicated by the access-allowed group can access the conference. In the conference information DB 43, multiple groups can be specified as access-allowed groups for each conference. In a record of the conference information DB 43 identified by a conference ID "3", "-" is specified in the "access-allowed group" field. This indicates that any user in any group can access a conference C in the record. Also in the conference information DB 43, the conference names may be used as conference IDs.

«Exemplary Processes»

Exemplary processes performed by the conference system 1 are described below.

<Account Registration Process>

Figure 9:
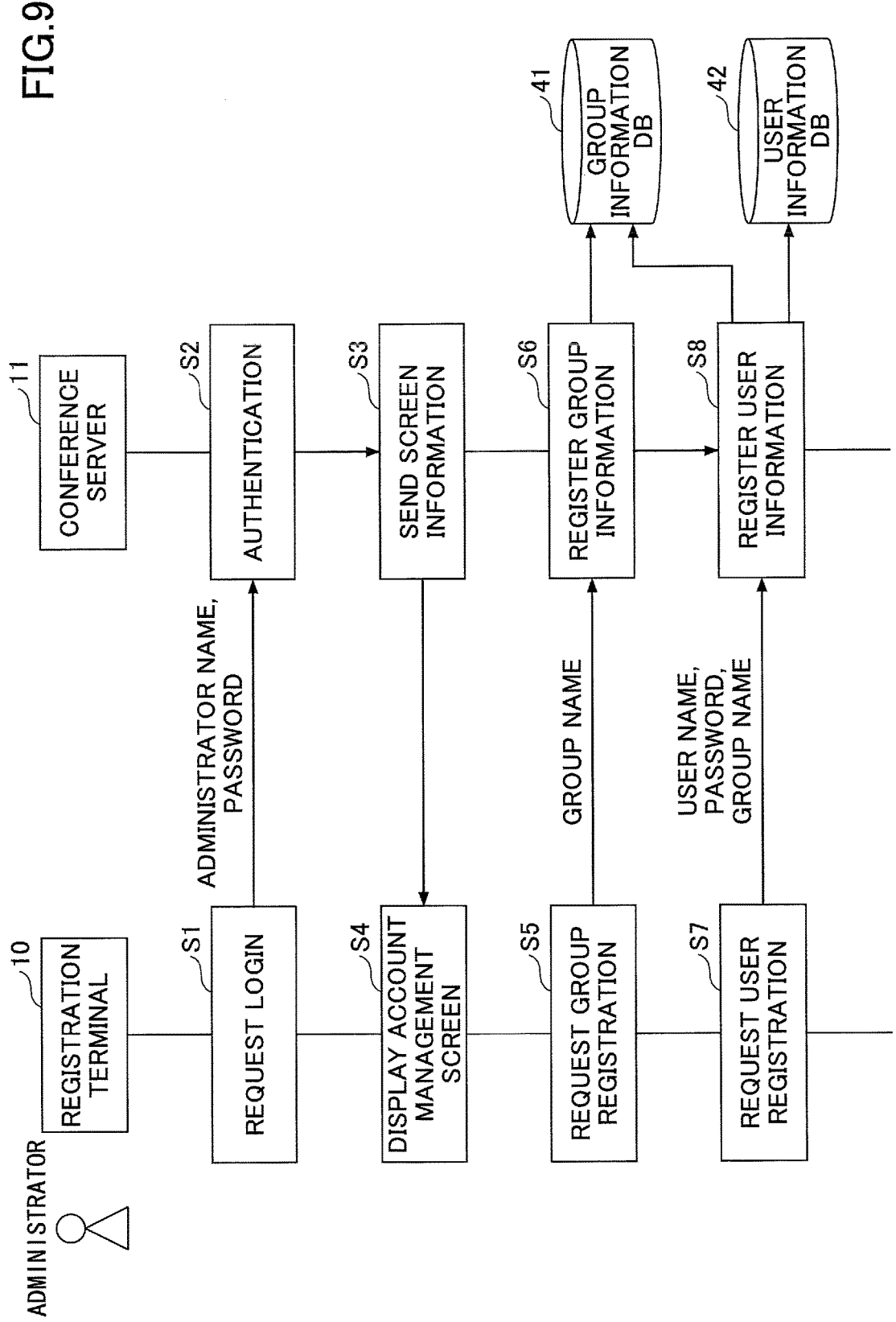
FIG. 9 is a flowchart illustrating an exemplary account registration process.

FIG. 9 is a flowchart illustrating an exemplary account registration process. In order to limit access to a conference, a user such as an administrator of the conference system 1, an organizer of the conference, or a presenter of the conference registers account information including group information and user information in advance. In the descriptions below, for brevity, it is assumed that an administrator of the conference system 1 registers account information. However, account information may also be registered by any other type of user.

At step S1, the administrator enters a user name and a password on the registration terminal 10 to log into the conference server 11. Then, the login requester 24 of the registration terminal 10 sends a login request to the conference server 11.

At step S2, the login processor 31 of the conference server 11 performs authentication based on the login request sent from the registration terminal 10. When the authentication is successful, the account management screen generator 33 generates an account management screen at step S3. Then, the screen transmitter 32 sends screen information of the generated account management screen to the registration terminal 10.

At step S4, the display controller 21 of the registration terminal 10 displays the account management screen based on the screen information received from the conference server 11. At step S5, the administrator enters a group name on the account management screen to request registration of a group. Then, the registration requester 23 sends a group registration request including the group name to the conference server 11. At step S6, the account registration processor 34 of the conference server 11 receives the group registration request from the registration terminal 10, and registers group information in the group information DB 41.

At step S7, the administrator enters a user name of a user, a password, and a group name of a group to which the user belongs on the account management screen to request registration of the user. Multiple group names may be specified for one user. Then, the registration requester 23 sends a user registration request including the user name, the password, and the group name to the conference server 11.

At step S8, the account registration processor 34 of the conference server 11 receives the user registration request from the registration terminal 10, and registers user information in the user information DB 42. Also, the account registration processor 34 updates the group information DB 41 by adding the user in the user registration request to a user list of a group corresponding to the group name in the user registration request.

<Conference Registration Process>

Figure 10:
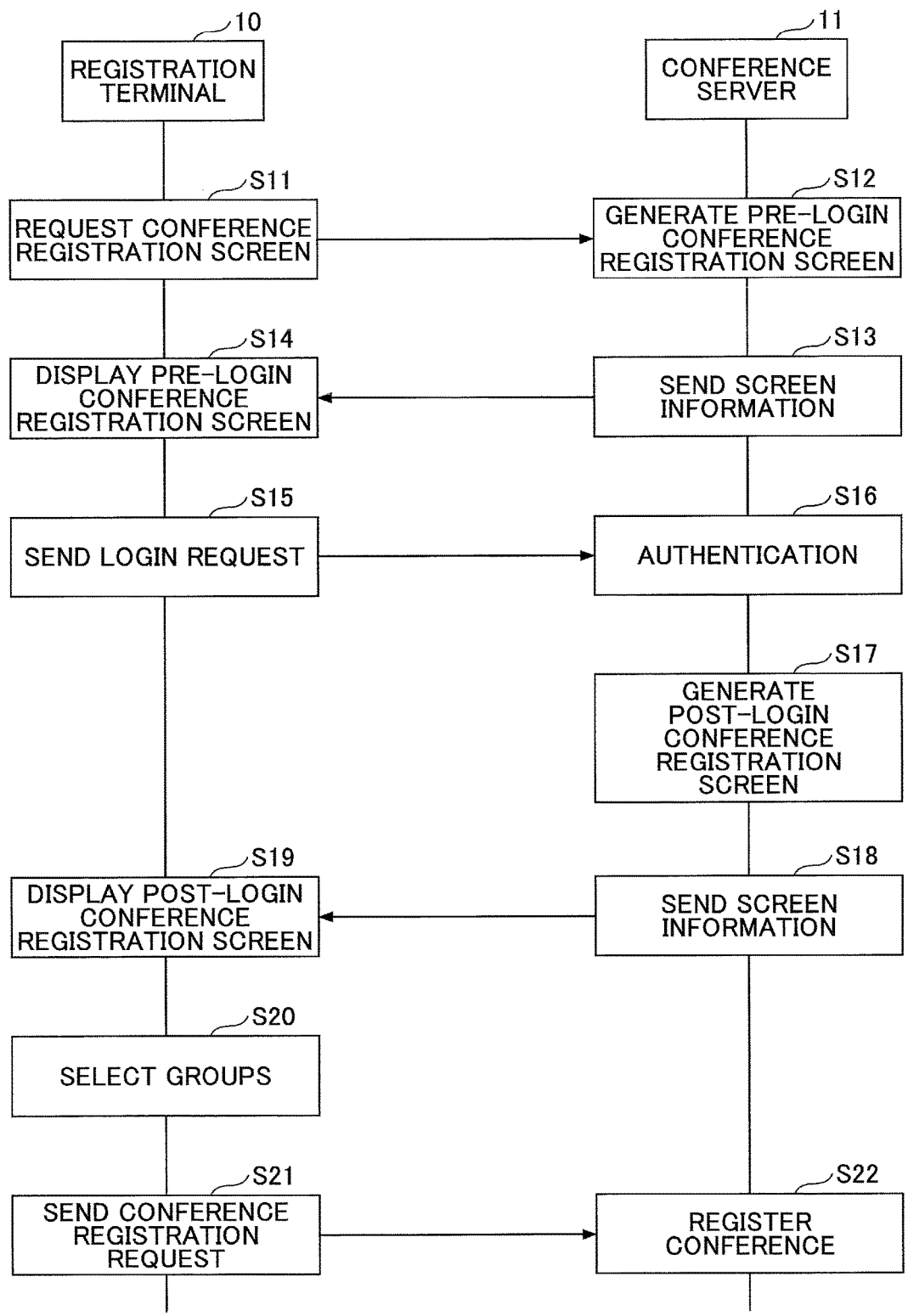
FIG. 10 is a flowchart illustrating an exemplary conference registration process.

FIG. 10 is a flowchart illustrating an exemplary conference registration process. Before holding a conference, a user such as an organizer or a presenter of the conference registers conference-related information including conference information and conference materials in the conference server 11. In the descriptions below, for brevity, it is assumed that an organizer of a conference registers conference-related information. However, conference-related information may also be registered by any other type of user.

At step S11, the organizer requests the registration terminal 10 to display a conference registration screen. Then, the display controller 21 of the registration terminal 10 sends a request for a conference registration screen to the conference server 11.

At step S12, the conference registration screen generator 36 of the conference server 11 generates a pre-login conference registration screen because the organizer has not yet logged into the conference server 11. Details of the pre-login conference registration screen are described later. At step S13, the screen transmitter 32 sends screen information of the generated pre-login conference registration screen to the registration terminal 10.

At step S14, the display controller 21 of the registration terminal 10 displays the pre-login conference registration screen based on the screen information received from the conference server 11. The organizer can enter conference information and material information on the pre-login conference registration screen and request registration of a conference so that the conference information and the material information are registered in the conference information DB 43 and the material information DB 44 of the conference server 11.

In the conference system 1 of the present embodiment, in order to register an access-limited conference, the organizer of the conference requests registration of the conference after logging into the conference server 11. At step S15, the organizer enters a user name and a password on the registration terminal 10 to log into the conference server 11.

Then, the login requester 24 of the registration terminal 10 sends a login request to the conference server 11.

At step S16, the login processor 31 of the conference server 11 performs authentication based on the login request sent from the registration terminal 10. When the authentication is successful, the process proceeds to step S17. At step S17, because the organizer has logged into the conference server 11, the conference registration screen generator 36 generates a post-login conference registration screen (or updates the conference registration screen). Details of the post-login conference registration screen are described later. At step S18, the screen transmitter 32 sends screen information of the generated post-login conference registration screen to the registration terminal 10.

At step S19, the display controller 21 of the registration terminal 10 displays the post-login conference registration screen (or updates the conference registration screen being displayed) based on the screen information received from the conference server 11. The post-login conference registration screen displays a list of groups to which the logged-in organizer belongs.

At step S20, the organizer selects one or more groups, which are to be specified as access-allowed groups, from the list of groups displayed on the post-login conference registration screen. Alternatively, at step S20, all of the groups to which the organizer belongs may be automatically selected. At step S21, the organizer enters conference information and material information on the post-login conference registration screen, and requests registration of a conference.

Then, the registration requester 23 sends a conference registration request including a conference name, a start date and time, conference materials, and the selected access-allowed groups to the conference server 11. At step S22, the conference registration processor 37 of the conference server 11 receives the conference registration request from the registration terminal 10, and registers the conference name, the start date and time, the conference materials, and the access-allowed groups in the conference information DB 43 and the material information DB 44.

As described above with reference to FIG. 10, in the conference system 1 of the present embodiment, different conference registration screens, i.e., a pre-login conference registration screen and a post-login conference registration screen, are used before and after a user logs into the conference server 11. The pre-login conference registration screen and the post-login conference registration screen are described below.

FIG. 11 is a drawing illustrating an exemplary pre-login conference registration screen 1000. FIG. 12 is a drawing illustrating an exemplary post-login conference registration screen 1100. The pre-login conference registration screen 1000 of FIG. 11 is displayed before the organizer logs into the conference server 11. The pre-login conference registration screen 1000 includes entry fields for entering conference information including a conference name and a start date and time, and an addition field for adding conference materials.

The pre-login conference registration screen 1000 allows a user (e.g., the organizer) to register, in the conference server 11, a conference for which no access-allowed group is specified, i.e., an access-unlimited conference access to which is not limited. The pre-login conference registration screen 1000 of FIG. 11 includes a Login button to allow the organizer to log into the conference server 11.

The post-login conference registration screen 1100 of FIG. 12 is displayed after the organizer logs into the conference server 11. In addition to the entry fields for entering conference information including a conference name and a start date and time in the pre-login conference registration screen 1000 of FIG. 11, the post-login conference registration screen 1100 includes an access-allowed group field 1101 that displays a list of groups to which the logged-in organizer belongs. The access-allowed group field 1101 may be configured to allow the organizer to select one or more groups from the list of groups to which the organizer belongs or may be configured to automatically select all of the groups to which the organizer belongs.

The post-login conference registration screen 1100 allows a user (e.g., the organizer) to register, in the conference server 12, a conference for which access-allowed groups are specified, i.e., an access-limited conference access to which is limited. The post-login conference registration screen 1100 of FIG. 12 includes a Logout button to allow the organizer to log out from the conference server 11. After the organizer logs out from the conference server 11, the post-login conference registration screen 1100 of FIG. 12 switches to the pre-login conference registration screen 1000 of FIG. 11.

Figure 13:
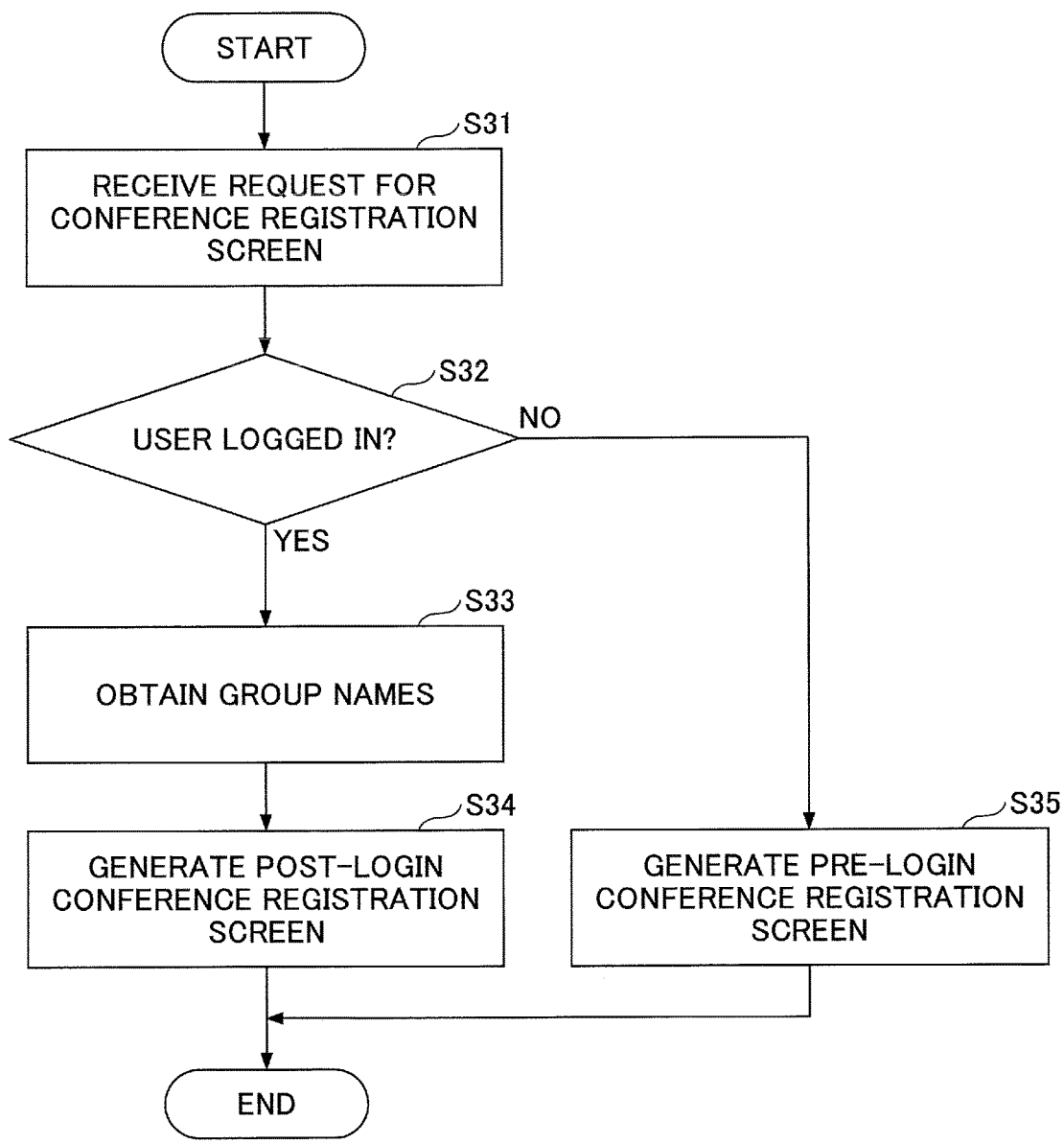
FIG. 13 is a flowchart illustrating an exemplary conference registration screen generation process.

At step S12 or S17 of FIG. 10, the conference registration screen generator 36 of the conference server 11 performs a conference registration screen generation process as illustrated by FIG. 13 to generate the pre-login conference registration screen 1000 or the post-login conference registration screen 1100.

FIG. 13 is a flowchart illustrating an exemplary conference registration screen generation process. At step S31, the conference registration screen generator 36 of the conference server 11 receives a request for a conference registration screen from the registration terminal 10. At step S32, the conference registration screen generator 36 determines whether a user who requested a conference registration screen at step S31 has logged into the conference server 11.

When it is determined that the user has logged into the conference server 11, the conference registration screen generator 36 proceeds to step S33, and obtains group names of groups to which the user belongs from the group information DB 41. At step S34, the conference registration screen generator 36 generates the post-login conference registration screen 1100 as illustrated by FIG. 12 that allows the user to specify access-allowed groups.

On the other hand, when it is determined that the user has not yet logged into the conference server 11, the conference registration screen generator 36 proceeds to step S35, and generates the pre-login conference registration screen 1100 as illustrated by FIG. 11 that does not allow the user to specify access-allowed groups.

As described above, with the conference system 1 of the present embodiment, a login process can be omitted when registering an access-unlimited conference access to which is not limited. Also with the conference system 1 of the present embodiment, the post-login conference registration screen 1100 can be displayed after a login process to enable a logged-in user to easily register an access-limited conference access to which is limited.

<Conference List Display Process>

Figure 14:
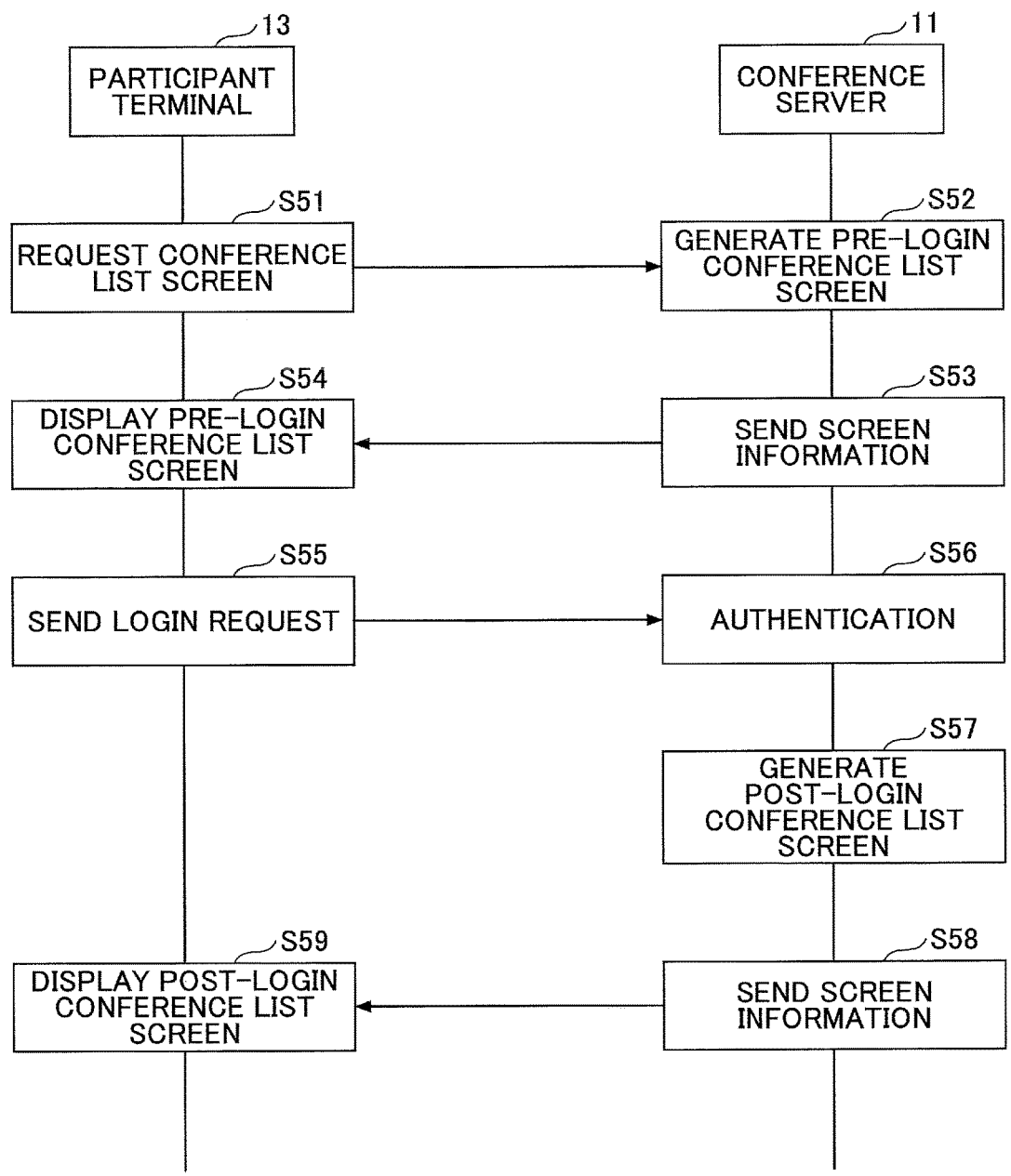
FIG. 14 is a flowchart illustrating an exemplary conference list display process.

FIG. 14 is a flowchart illustrating an exemplary conference list display process. In the descriptions below, for brevity, it is assumed that a participant requests to display a conference list screen. However, any other type of user (e.g., a presenter) may also request to display a conference list screen. At step S51, the participant requests the registration terminal 13 to display a conference list screen. Then, the conference list requester 54 of the participant terminal 13 sends a request for a conference list screen to the conference server 11.

At step S22, the conference list screen generator 35 of the conference server 11 generates a pre-login conference list screen because the participant has not yet logged into the conference server 11. The pre-login conference list screen displays a list of access-unlimited conferences access to which is not limited. Details of the pre-login conference list screen are described later. At step S53, the screen transmitter 32 sends screen information of the generated pre-login conference list screen to the participant terminal 13.

At step S54, the display controller 51 of the participant terminal 13 displays the pre-login conference list screen based on the screen information received from the conference server 11. The pre-login conference list screen displays a list of access-unlimited conferences. Therefore, when the participant is going to participate in an access-unlimited conference, the participant can select the access-unlimited conference from the list of access-unlimited conferences, and view conference information and a conference material of the access-unlimited conference.

On the other hand, when the participant is going to participate in an access-limited conference in the conference system 1 of the present embodiment, the participant needs to log into the conference server 11. In this exemplary process, it is assumed that the participant requests a login to the conference server 11.

At step S51, the participant enters a user name and a password on the participant terminal 13 to log into the conference server 11. Then, the login requester 57 of the participant terminal 13 sends a login request to the conference server 11.

At step S56, the login processor 31 of the conference server 11 performs authentication based on the login request sent from the participant terminal 13. When the authentication is successful, the process proceeds to step S57. At step S57, because the participant has logged into the conference server 11, the conference list screen generator 35 generates a post-login conference list screen (or updates the conference list screen). The post-login conference list screen displays a list of access-limited conferences for which groups where the logged-in participant belongs are specified as access-allowed groups, and a list of access-unlimited conferences. Details of the post-login conference list screen are described later. At step S58, the screen transmitter 32 sends screen information of the generated post-login conference list screen to the participant terminal 13.

At step S59, the display controller 51 of the participant terminal 13 displays the post-login conference list screen based on the screen information received from the conference server 11 (or updates the conference list screen being displayed).

On the post-login conference list screen, the participant can select even an access-limited conference from the list of access-limited conferences, and view conference information and a conference material of the access-limited conference.

Next, an exemplary process, where a user selects a conference that the user is going to participate in, and views conference information and a conference material of the conference, is described. When the user selects, on the conference list screen, a conference that the user is to participate in, the participation processor 55 of the participant terminal 13 receives a request to participate in the selected conference. Next, the participation processor 55 of the participant terminal 13 sends a participation request including a conference ID of the selected conference to the conference server 11. Based on the participation request, the conference server 11 establishes a session with the participant terminal 13. The material acquirer 53 of the participant terminal 13 sends a material request via the established session to the conference server 11, and receives a conference material associated with the conference ID in the participation request from the conference controller 38 of the conference server 11. Then, during the conference, when operation information indicating an operation performed on the conference material is received from one of the participant terminals 13 participating in the same conference, the conference controller 38 of the conference server 11 sends the operation information via the established sessions to the other participant terminals 13 so that the participant terminals 13 can share a display screen displaying the conference material.

As described above with reference to FIG. 14, in the conference system 1 of the present embodiment, different conference list screens, i.e., a pre-login conference list screen and a post-login conference list screen, are used before and after a user logs into the conference server 11. The pre-login conference list screen and the post-login conference list screen are described below.

FIG. 15 is a drawing illustrating an exemplary pre-login conference list screen 1200. FIG. 16 is a drawing illustrating an exemplary post-login conference list screen 1300. The pre-login conference list screen 1200 of FIG. 15 is displayed before the participant logs into the conference server 11. The pre-login conference list screen 1200 displays a conference list 1201 including access-unlimited conferences.

When the participant is going to participate in an access-unlimited conference, the participant can select the access-unlimited conference from the conference list 1201 on the pre-login conference list screen 1200, and view conference information and a conference material of the access-unlimited conference.

The pre-login conference list screen 1200 of FIG. 15 includes a Login button to allow the participant to log into the conference server 11.

The post-login conference list screen 1300 of FIG. 16 is displayed after the participant logs into the conference server 11. The post-login conference list screen 1300 displays a conference list 1301 that includes access-limited conferences whose access-allowed groups include groups that the logged-in participant belongs to, as well as access-unlimited conferences. The conference list screen 1300 may be configured such that access-limited conferences and access-unlimited conferences can be distinguished from each other based on their positions, colors, or marks.

On the post-login conference list screen 1300, the participant can select even an access-limited conference from the conference list 1301, and view conference information and a conference material of the access-limited conference.

The post-login conference list screen 1300 of FIG. 16 includes a Logout button to allow the participant to log out from the conference server 11. After the participant logs out from the conference server 11, the post-login conference list screen 1300 of FIG. 16 switches to the pre-login conference list screen 1200 of FIG. 15.

Figure 17:
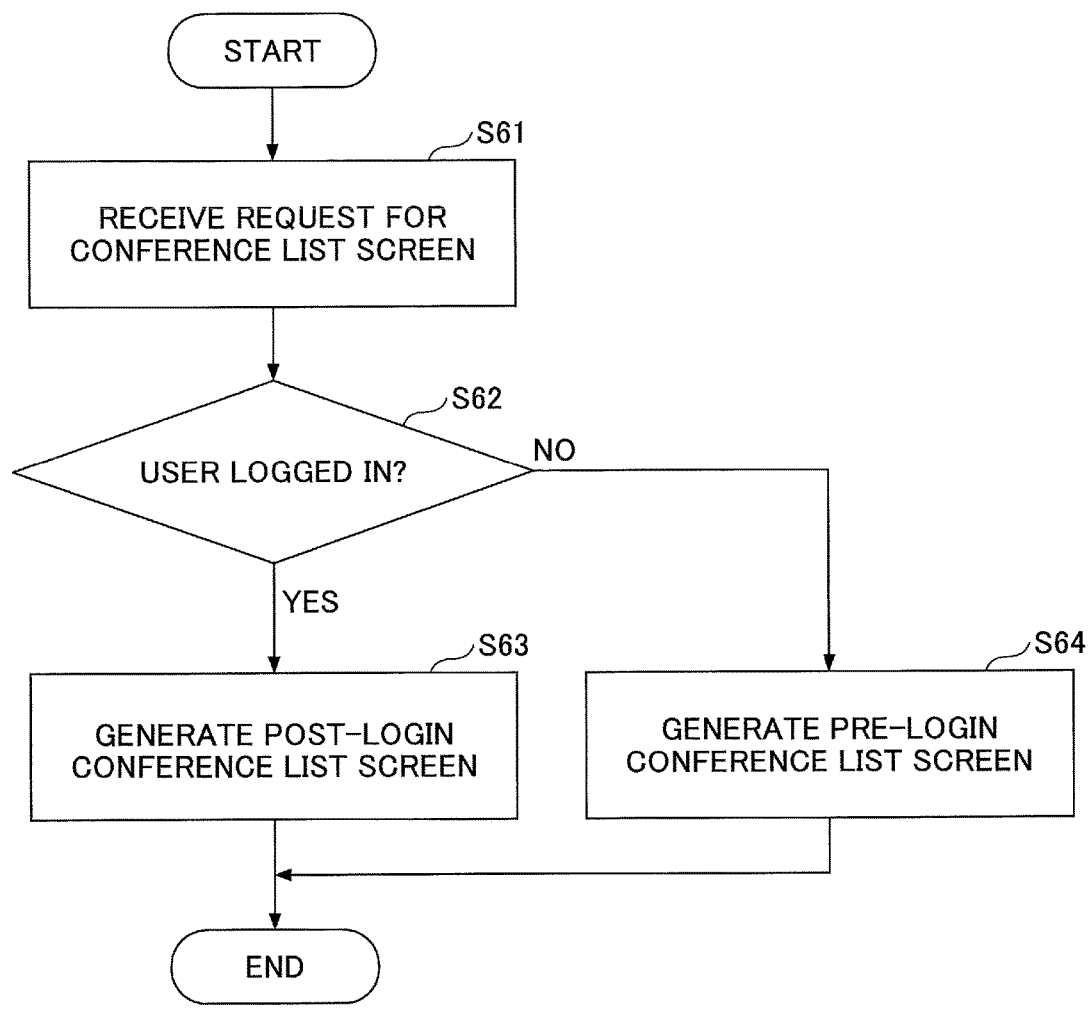
FIG. 17 is a flowchart illustrating an exemplary conference list screen generation process.

At step S52 or S57 of FIG. 14, the conference list screen generator 35 of the conference server 11 performs a conference list screen generation process as illustrated by FIG. 17 to generate the pre-login conference list screen 1200 or the post-login conference list screen 1300.

FIG. 17 is a flowchart illustrating an exemplary conference list screen generation process. At step S61, the conference list screen generator 35 of the conference server 11 receives a request for a conference list screen from the participant terminal 13. At step S62, the conference list screen generator 35 determines whether a user who requested a conference list screen at step S61 has logged into the conference server 11.

When it is determined that the user has logged into the conference server 11, the conference list screen generator 35 proceeds to step S63, and obtains group names of groups to which the user belongs from the group information DB 41. Then, the conference list screen generator 35 generates the post-login conference list screen 1300 including the conference list 1301 that includes access-limited conferences whose access-allowed groups include groups that the user belongs to, as well as access-unlimited conferences.

On the other hand, when it is determined that the user has not yet logged into the conference server 11, the conference list screen generator 35 proceeds to step S64, and generates the pre-login conference registration screen 1200 that includes the conference list 1201 of access-unlimited conferences.

As described above, with the conference system 1 of the present embodiment, a login process can be omitted when displaying a list of access-unlimited conferences. Also with the conference system 1 of the present embodiment, a user can easily display a list of access-limited conferences whose access-allowed groups include groups that the user belongs to, by logging into the conference server 11.

«Variations»

The pre-login conference list screen 1200 of FIG. 15 and the post-login conference list screen 1300 of FIG. 16 may be configured to display thumbnails of conference materials.

Figure 18:
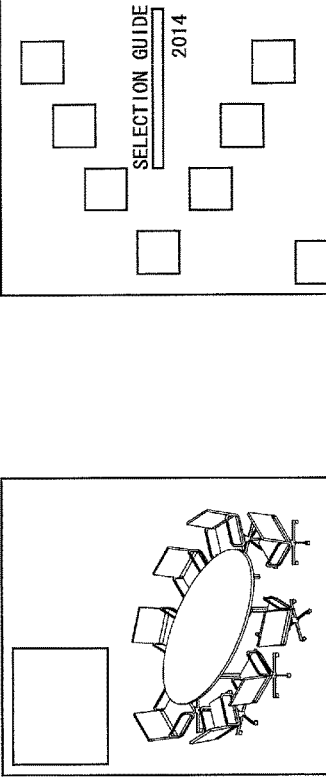
FIG. 18 is a drawing illustrating another exemplary pre-login conference list screen.

FIG. 18 is a drawing illustrating another exemplary pre-login conference list screen 1400. FIG. 19 is a drawing illustrating another exemplary post-login conference list screen 1500. The pre-login conference list screen 1400 displays a list of access-unlimited conferences together with thumbnails of conference materials used for the respective conferences. The post-login conference list screen 1500 displays a list of access-limited conferences whose access-allowed groups include groups that a logged-in user belongs to and access-unlimited conferences, together with thumbnails of conference materials used for the respective conferences.

The configuration of the conference system 1 of FIG. 1 may be varied such that the registration terminal 10 and/or the participant terminal 13 includes the functions of the conference server 11. In this case, the conference server 11 may be omitted. In the conference system 1 of FIG. 1, account information including group information and user information is registered in the conference server 11 in response to a request from, for example, an administrator of the conference system 1. However, the conference system 1 may be configured such that the account information is registered in an apparatus other than the conference server 11. For example, the conference system 1 may be configured to refer to account information registered in an external system.

«Summary»

The conference system 1 of the present embodiment makes it possible to display either the pre-login conference registration screen 1000 access to which is not limited by an account or the post-login conference registration screen 1100 access to which is limited by an account based on whether a user has logged into the conference server 11. Also, the conference system 1 of the present embodiment makes it possible to display either the pre-login conference list screen 1201 access to which is not limited by an account or the post-login conference list screen 1301 access to which is limited by an account based on whether a user has logged into the conference server 11.

Thus, the conference system 1 of the present embodiment enables a user to easily handle both conference-related information access to which is limited by an account and conference-related information access to which is not limited by an account.

An information processing apparatus, an information processing method, and an information processing apparatus according to an embodiment of the present invention are described above. However, the present invention is not limited to the specifically disclosed embodiment, and variations and modifications may be made without departing from the scope of the present invention. For example, although a conference system is described as an example of an information processing system in the above embodiment, the present invention may also be applied to other types of systems such as a seminar system and an educational system for displaying registered information.

The conference server 11 is an example of an information processing apparatus. The registration terminal 10 and the participant terminal 13 are examples of terminals. The conference information DB 43 is an example of a first storage. The login processor 31 is an example of a login processor. The screen transmitter 32 is an example of a transmitter. The conference registration processor 37 is an example of an information registration processor. The conference registration screen generator 36 is an example of an information registration screen generator. The group information DB 41 is an example of a second storage.

Although the conference system 1 including the registration terminal 10, the conference server 11, and the participant terminals 13 is described above, the configuration of a system may be modified according to, for example, its use or purpose.

An aspect of this disclosure provides an information processing apparatus, an information processing method, and an information processing system that can handle both access-limited identification information access to which is limited by an account and access-unlimited identification information access to which is not limited by an account.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, a hard disk, a CD-ROM, a magnetic tape device or a solid state memory device. The hardware may include any desired kind of hardware resources such as a central processing unit (CPU), a random access memory (RAM), and a hard disk drive (HDD). The CPU may be implemented by any desired kind of and any desired number of processors. That is, the CPU may be implemented by one processor or two or more processors. The RAM may be implemented by any desired kind of volatile or non-volatile memory. The HDD may be implemented by any desired kind of non-volatile memory capable of storing a large amount of data. The hardware resources may additionally include an input device, an output device, and/or a network device, depending on the type of the apparatus. Alternatively, the HDD may be provided outside of the apparatus as long as the HDD is accessible. A cash memory of the CPU and/or the RAM may function as a physical memory or a primary memory of the apparatus, while the HDD may function as a secondary memory of the apparatus.

What is claimed is:

1. An information processing apparatus connected to a plurality of terminals, the information processing apparatus comprising:
   a first storage that stores electronic data to be shared and displayed by the terminals, first conference information associated with an access-allowed group that is allowed to access one or more conferences indicated by the first conference information, and second conference information for which no access-allowed group is specified; and
   one or more hardware processors that execute a process including
      receiving a login request to log into the information processing apparatus from each of the terminal, and performing a login process based on an account specified by the each of the terminals;
      when a conference list screen request is received from a logged-in terminal of the terminals that has logged into the information processing apparatus, sending, to the logged-in terminal, a conference list screen including a list of the first conference information for which a group, to which a user indicated by the account belongs, is specified as the access-allowed group and a list of the second conference information for which no access-allowed group is specified;
      when the conference list screen request is received from a non-logged-in terminal of the terminals that has not logged into the information processing apparatus, sending, to the non-logged-in terminal, a conference list screen that includes the list of the second conference information for which no access-allowed group is specified and that does not include the list of the first conference information;
      when a registration screen request is received from the non-logged-in terminal, generating a second conference registration screen for registering the second conference information and sending the second conference registration screen to the non-logged-in terminal; and
      when the registration screen request is received from the logged-in terminal, generating a first conference registration screen for registering the first conference information and for selecting one or more of the accounts allowed to access the first conference information, and sending the first conference registration screen to the logged-in terminal; and
   a second storage that stores the accounts in association with group information of groups to which the accounts belong, wherein
      the first storage stores the first conference information in association with the group information of one or more of the groups allowed to access the first conference information; and
      when the conference list screen request is received from the logged-in terminal, the one or more hardware processors send, to the logged-in terminal, the second conference information and the first conference information that is associated with the group information of one or more of the groups to which the account specified by the logged-in terminal belongs.

2. The information processing apparatus as claimed in claim 1, wherein the process further includes
   when one of the first conference information and the second conference information is specified by one of the terminals on the conference list screen, causing the one of the terminals to start sharing the electronic data corresponding to the one of the first conference information and the second conference information with other ones of the terminals.

3. The information processing apparatus as claimed in claim 2, wherein
   each of the first conference information and the second conference information is conference identification information for identifying a conference; and
   when the conference identification information displayed on the one of the terminals is specified by a user, the one or more hardware processors cause the one of the terminals to start sharing the electronic data corresponding to the conference identification information with the other ones of the terminals.

4. The information processing apparatus as claimed in claim 1, wherein the process further includes
   when a registration request to register identification information is received from the non-logged-in terminal, storing the identification information as the second conference information in the first storage, and
   when the registration request to register the identification information is received from the logged-in terminal, storing the identification information as the first conference information in the first storage.

5. The information processing apparatus as claimed in claim 1, wherein the first storage stores the second conference information in association with group information indicating that any user belonging to any group is allowed to access the second conference information.

6. The information processing apparatus as claimed in claim 1, wherein when the registration screen request is received from the logged-in terminal, the one or more hardware processors select one or more of the groups to which the account specified by the logged-in terminal belongs, and generate the first conference registration screen for registering the first conference information that is accessible by the selected one or more of the groups.

7. The information processing apparatus as claimed in claim 1, wherein the registration screen request is received from the logged-in terminal, the one or more hardware processors generate the first conference registration screen that allows the logged-in terminal to select one or more of the groups to which the account specified by the logged-in terminal belongs and to register the first conference information that is accessible by the selected one or more of the groups.

8. A method performed by an information processing apparatus connected to a plurality of terminals, the method comprising:
   registering, in a first storage, electronic data to be shared and displayed by the terminals, first conference information associated with an access-allowed group that is allowed to access one or more conferences indicated by the first conference information, and second conference information for which no access-allowed group is specified;

receiving a login request to log into the information processing apparatus from each of the terminals, and performing a login process based on an account specified by the each of the terminals;

when a conference list screen request is received from a logged-in terminal of the terminals that has logged into the information processing apparatus, sending, to the logged-in terminal, a conference list screen including a list of the first conference information for which a group, to which a user indicated by the account belongs, is specified as the access-allowed group and a list of the second conference information for which no access-allowed group is specified;

when the conference list screen request is received from a non-logged-in terminal of the terminals that has not logged into the information processing apparatus, sending, to the non-logged-in terminal, a conference list screen that includes the list of the second conference information for which no access-allowed group is specified and that does not include the list of the first conference information;

when a registration screen request is received from the non-logged-in terminal, generating a second conference registration screen for registering the second conference information and sending the second conference registration screen to the non-logged-in terminal;

when the registration screen request is received from the logged-in terminal, generating a first conference registration screen for registering the first conference information and for selecting one or more of the accounts allowed to access the first conference information, and sending the first conference registration screen to the logged-in terminal;

storing, in a second storage, the accounts in association with group information of groups to which the accounts belong, wherein the first storage stores the first conference information in association with the group information of one or more of the groups allowed to access the first conference information; and when the conference list screen request is received from the logged-in terminal, sending, to the logged-in terminal, the second conference information and the first conference information that is associated with the group information of one or more of the groups to which the account specified by the logged-in terminal belongs.

9. An information processing system, comprising:
a plurality of terminals;
a first storage that stores electronic data to be shared and displayed by the terminals, first conference information associated with an access-allowed group that is allowed to access one or more conferences indicated by the first conference information, and second conference information for which no access-allowed group is specified; and one or more hardware processors that execute a process including
receiving a login request to log into the information processing apparatus from each of the terminals, and performing a login process based on an account specified by the each of the terminals;
when a conference list screen request is received from a logged-in terminal of the terminals that has logged into the information processing apparatus, sending, to the logged-in terminal, a conference list screen including a list of the first conference information for which a group, to which a user indicated by the account belongs, is specified as the access-allowed group and a list of the second conference information for which no access-allowed group is specified;
when the conference list screen request is received from a non-logged-in terminal of the terminals that has not logged into the information processing apparatus, sending, to the non-logged-in terminal, a conference list screen that includes the list of the second conference information for which no access-allowed group is specified and that does not include the list of the first conference information;
when a registration screen request is received from the non-logged-in terminal, generating a second conference registration screen for registering the second conference information and sending the second conference registration screen to the non-logged-in terminal; and
when the registration screen request is received from the logged-in terminal, generating a first conference registration screen for registering the first conference information and for selecting one or more of the accounts allowed to access the first conference information, and sending the first conference registration screen to the logged-in terminal; and a second storage that stores the accounts in association with group information of groups to which the accounts belong, wherein the first storage stores the first conference information in association with the group information of one or more of the groups allowed to access the first conference information; and
when the conference list screen request is received from the logged-in terminal, the one or more hardware processors sending, to the logged-in terminal, the second conference information and the first conference information that is associated with the group information of one or more of the groups to which the account specified by the logged-in terminal belongs.

* * * * *